INVENTORS
PAUL R. LAGONEGRO
PAUL D. KELLER
BY

ATTORNEY

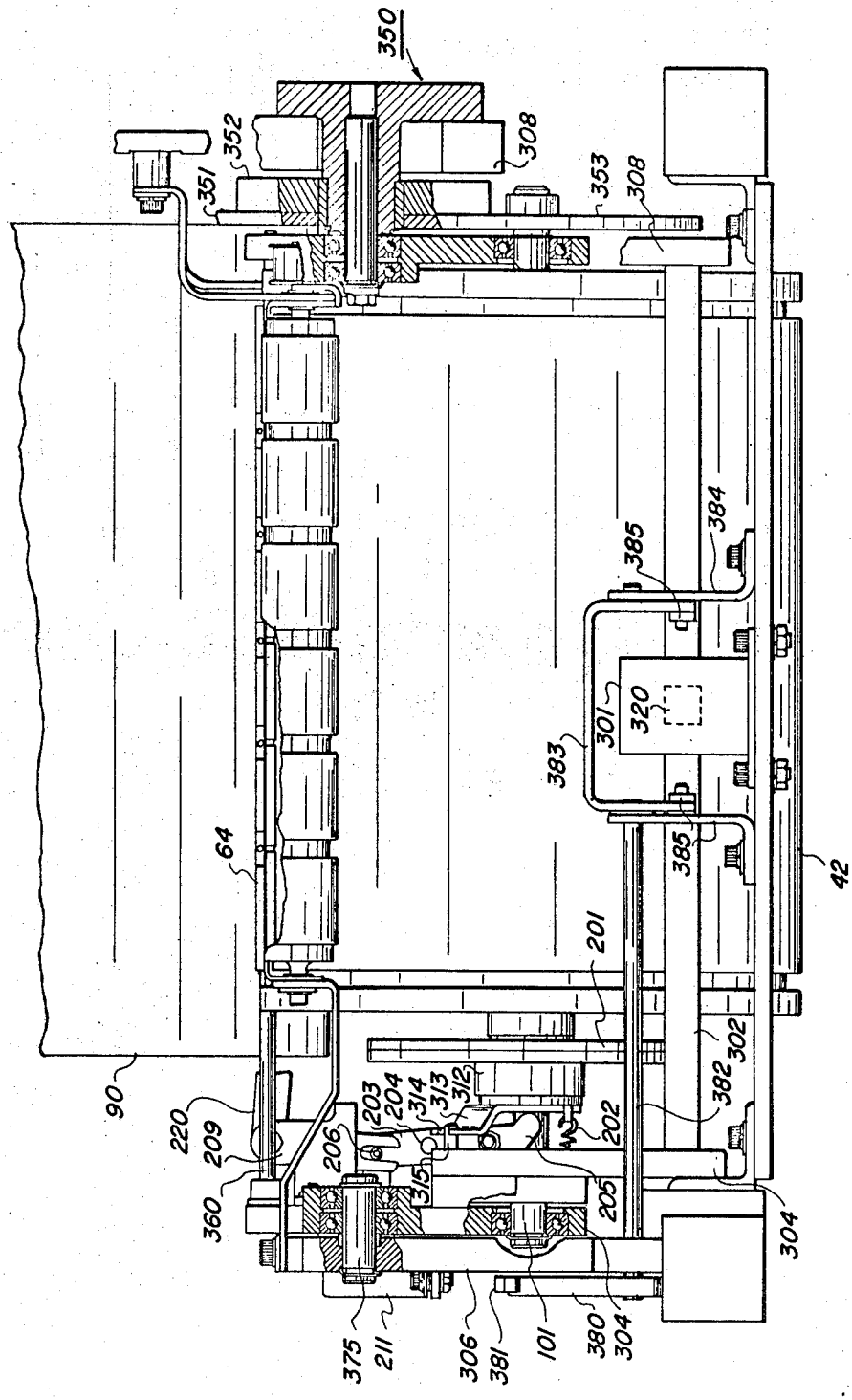

United States Patent Office 3,567,213
Patented Mar. 2, 1971

3,567,213
**CONTROL APPARATUS FOR REGISTER
STOPS AND GRIPPER FINGERS**
Paul R. Lagonegro, Henrietta, and Paul D. Keller,
Rochester, N.Y., assignors to Xerox Corporation,
Rochester, N.Y.
Filed June 4, 1969, Ser. No. 830,236
Int. Cl. B65h 5/14, 29/06
U.S. Cl. 271—3                                        4 Claims

ABSTRACT OF THE DISCLOSURE

An apparatus for selectively controlling the operation of register stops and gripper fingers on a transfer drum in a reproduction apparatus having a non-rotating cam and a rotatable follower which are located external to the transfer drum. The cam is selectively movable between an inoperative position which is remote from the transfer drum and an operative position which is immediately adjacent the transfer drum. The follower rotates with the transfer drum and operates the register stops and gripper fingers on the drum in response to the shape of the cam only when the cam is in its operative position. The cam is moved into its operative position while the transfer drum continues to rotate by a solenoid which pivots an arm against the cam and moves it into engagement with the follower.

BACKGROUND OF THE INVENTION

This invention relates to control apparatus for operating register stops and gripper fingers on a transfer drum in a reproduction system, and more particularly, to a control apparatus for selectively operating the register stops and gripper fingers on a transfer drum as the drum continues to rotate.

In copying systems such as those which employ transfer or powder imaging, a uniform electrostatic charge is generated on the surface of a photoconductive plate and the plate is exposed to a light image conforming to the information to be copied. A latent electrostatic image is created which is then developed with a finely-divided powder material such as toner. The toner image thus created is transferred from the surface of the plate to a copy sheet thereby forming a copy of the information being reproduced.

One technique used to transfer the toner image from the surface of the plate to the copy sheet is to place the copy sheet between the plate and a transfer drum having a conductive core and a relatively non-conductive surface material and apply an electrical potential to the core of the transfer drum as it rotates to bring the copy sheet in contact with the plate. The application of a potential to the transfer drum forms a field between the transfer drum and plate which causes the toner image to be attracted to the copy sheet. As a result of this attraction the toner remains on the copy sheet when the latter is removed from the plate.

The copy sheet is fed onto the surface of the transfer drum and its leading edge is aligned to register stops and gripped by gripper fingers which are part of the transfer drum. After being secured to the drum by the gripper fingers, the copy sheet is rotated through the transfer station as a potential is placed on the drum core and the toner image is attracted to the copy sheet.

In copying systems in which one toner image is transferred to a copy sheet, the register stops and gripper fingers are operated during each revolution of the transfer drum since the copy sheet is removed from the drum after passing through the transfer station once. However, in systems in which a plurality of toner images are transferred to a single copy sheet, such as in a color reproduction system where toner images of different colors are transferred to the same copy sheet on top of one another, the transfer drum conveys the copy sheet through the transfer station in a plurality of revolutions before the gripper fingers on the drum release the copy sheet to feed the copy sheet to the next processing station. In this latter case, the gripper fingers and register stops need not be operated during each revolution of the transfer drum, and, therefore, the control mechanism for the stops and fingers must be sufficiently flexible to be operated during only selected revolutions as well as during each revolution.

In continuous copying systems, such as those employing an electrostatic drum which continually rotates through various processing stations arranged about its periphery, it is desirable to avoid stopping the transfer drum during the operation of the stops and fingers since the relative positions, or registration, between the surface of the transfer drum and that of the electrostatic drum is critical during the transfer step to assure that the toner is transferred to the copy sheet in proper alignment therewith. To maintain accurate registration between the two drums the copy sheet is fed onto the transfer drum while the transfer drum continues to rotate and, as a result, the register stops and gripper fingers have to be activated as the transfer drum continues to rotate.

The operation of transfer drum register stops and gripper fingers has been controlled by electrical devices which are located within the transfer drum, however, such devices are expensive and are not as durable or reliable over long term machine life as a comparable mechanical apparatus. The present invention is a mechanical apparatus for controlling the operation of the register stops and gripper fingers which is located principally outside the transfer drum. The present apparatus can operate the stops and fingers during each revolution of the drum when only one toner image is transferred to the copy sheet or only during selected revolutions of the drum when several toner images are to be transferred to the same copy sheet. The stops and fingers are operated as the transfer drum continues to rotate so that a toner image is always transferred to the copy sheet in registration therewith.

The apparatus has a non-rotating cam positionable immediately adjacent the transfer drum to engage a follower which rotates with the transfer drum. The registration stops and gripper fingers are operated in accordance with the movement of the follower which, in turn, operates in response to the shape of the cam. The registration stops and gripper fingers can be operated only during selected revolutions of the transfer drum simply by moving the cam in and out of engagement with the follower.

Accordingly, it is an object of the invention to improve control apparatus for operating the register stops and gripper fingers on a transfer drum.

It is a further object of the invention to improve the control apparatus for operating the register stops and gripper fingers on a transfer drum only during selected revolutions of the transfer drum.

It is a further object of the invention to improve the control apparatus for operating the register stops and gripper fingers on a transfer drum as the drum continues to rotate.

It is a further object of the invention to improve the control apparatus for operating the register stops and gripper fingers on a transfer drum by a mechanical apparatus which is located principally external to the transfer drum.

SUMMARY

The present invention is an apparatus for selectively controlling the operation of the register stops and gripper fingers on a transfer drum having a non-rotating cam and a follower which rotates with the transfer drum. The follower is attached to a rotatable shaft mounted in the end plates of the transfer drum which, in turn, supports and controls the movement of the register stops and gripper fingers. The cam slides on the main shaft of the transfer drum between an operative position immediately adjacent the drum where it engages the follower and an inoperative position remotely located from the drum where it does not engage the follower. The follower operates the stops and fingers in response to the periphery of the cam only when the cam is in its operative position. The cam is moved between its operative and inoperative positions by a pivotable arm which is actuated by a solenoid. The cam also includes a keeper arm mounted so as to prevent the cam from turning with the main shaft of the transfer drum.

BRIEF DESCRIPTION OF THE DRAWINGS

For a better understanding of the invention as well as other objects and further features thereof, reference is had to the following detailed description to be used in conjunction with the accompanying drawings, wherein:

FIG. 7 is a rear view of the transfer drum and supporting mechanisms.

DESCRIPTION OF THE PREFERRED EMBODIMENT

Figure 1:
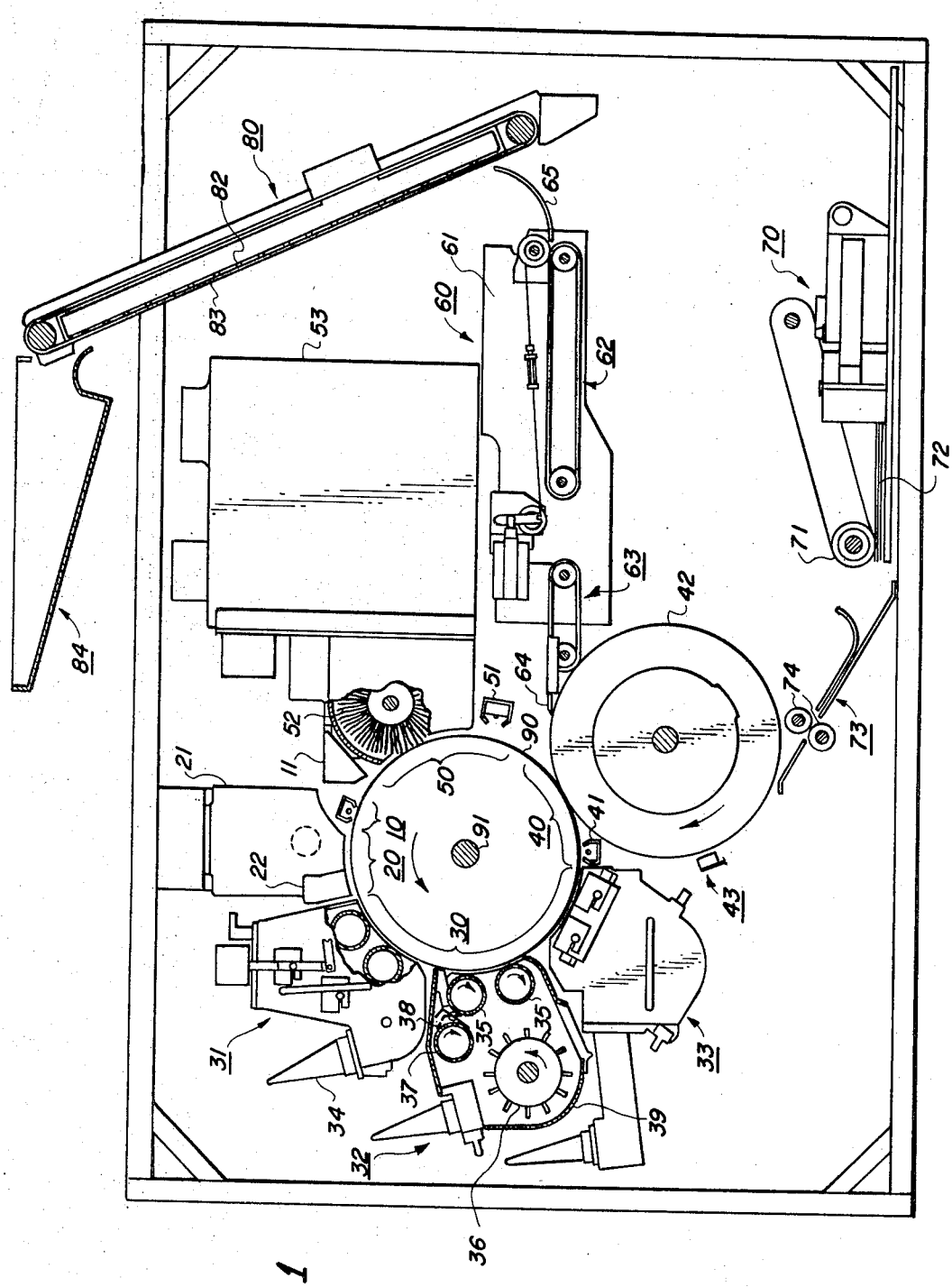
FIG. 1 is a schematic illustration of the invention in a color copying machine.

The apparatus described herein is an electrostatic reproduction system which reproduces a multicolor copy from a multicolor original such as a document. Referring to FIG. 1 there is shown a color copying machine which reproduces an original in color xerographically. The apparatus for reproducing multicolor images includes an electrostatic drum or photoreceptor 90, the surface of which can include a photoconductive material overlying a conductive material, which rotates through various xerographic processing stations; charging station 10, exposing station 20, developing station 30, transfer station 40, and cleaning station 50. The photoreceptor rotates with shaft 91 in the direction indicated by the arrow through the stations mentioned above in a processing cycle, the approximate positions of the various stations being shown by the brackets next to the drum surface in FIG. 1.

The photoreceptor makes a plurality of revolutions; for instance, two or three revolutions, through the processing stations in order to carry out a multicolor copying cycle. During each revolution, a latent electrostatic image corresponding to one of the colors in the original is formed on the surface of the photoreceptor and developed with a finely-divided, pigmented material such as toner of the corresponding color, and, then, the toner image is transferred from the photoreceptor to a copy sheet at the transfer station. The toner images, each of a different color, that are formed on the photoreceptor in each revolution of a copying cycle are transferred to the copy sheet in registration with one another and the composite toner image resulting on the copy sheet after the copying cycle has been completed is a multicolor copy of the original.

In the machine shown in FIG. 1, the developing station contains three separate developing assemblies 31, 32, and 33. Although each developing assembly is mechanically similar, the color of the toner applied to the surface of the photoreceptor 90 by each developing assembly is different. In the apparatus shown, for example, the toner colors in the developing assemblies 31, 32, and 33 are yellow, cyan, and magenta, respectively. The three toner colors can be developed in any convenient color order and the different color images formed can be placed on the copy sheet in any order. The developing assemblies are selectively operated during a copying cycle so that only one of the assemblies applies toner to the surface of the photoreceptor during each revolution. Thus, in the system shown in FIG. 1, during the first revolution yellow toner is applied to the surface of the photoreceptor by developing assembly 31 while developing assemblies 32 and 33 remain in an inoperative condition. Then, during the second revolution of the photoreceptor, cyan toner is applied to the surface of the photoreceptor by developing assembly 32 while developing assemblies 31 and 33 remain in an inoperative condition. Finally, during the third revolution of the photoreceptor, magenta toner is applied to the surface of the photoreceptor by developing assembly 33 while developing assemblies 31 and 32 remain inoperative. In this manner, toner images of each of the three developing colors used in the apparatus shown in FIG. 1, yellow, cyan, and magenta, are formed on the photoreceptor and then transferred to the copy sheet during successive revolutions of the photoreceptor.

A latent electrostatic image is formed on the surface of the photoreceptor during each revolution by first placing a uniform charge on its surface and then exposing the charged surface to a light image corresponding to the particular color toner being applied to the photoreceptor by a developing assembly during that revolution. Any suitable device 21 can be used to form the light images. Similarly, any suitable charging means can be utilized at station 10 to charge the surface of the photoreceptor such as the corona charging device indicated by reference number 11. Exposing station 20, in addition to having means to expose the photoreceptor to light images as described above, can include an interimage erasing device which dissipates, or erases, the charge on the surface of the photoreceptor between latent images. This apparatus can be any suitable device for dissipating the charge on the photoreceptor such as an electroluminescent panel 22 which is activated only between latent images. The interimage erasing device is a desirable feature when a latent image formed on the photoreceptor does not completely cover the periphery of the photoreceptor since these areas would otherwise completely develop out as the photoreceptor passed through the developing station and cause a waste of toner.

The developing station 30 includes three identical developing apparatus 31, 32, and 33 which apply toner particles to the latent image on the photoreceptor surface. These three developing assemblies, all of which are normally in an inoperative condition, are brought into a operative condition selectively in accordance with the color toner to be placed on the photoreceptor during any particular revolution. The housing of developing assembly 32 is broken away so that the internal elements of the assembly can be seen. The members which apply toner to the photoreceptor are magnetic brushes 35 which bring magnetic developer, a mixture of magnetic carrier particles and toner particles, into contact with the surface of the photoreceptor 90. The developing assembly is contained within housing 39 and is replenished with toner particles from supply container 34 as the toner is used. The developer is moved to the upper portion of the housing, which contains magnetic transporter 37 and movable gate 38, by agitator 36. Upon reaching the upper portion of the housing the developer is attracted to the magnetic transporter which rotates in the clockwise direction to convey the developer toward the vicinity of gate 38.

Depending upon the position of gate 38, the developer is either passed onto magnetic brushes 35 to be applied to the photoreceptor or is dropped from the transporter directly into the lower portion of the housing without touching the magnetic brushes. The developing assembly is in an inoperative condition when the gate 38 is in the position shown in the solid lines. In this position the gate acts as a guide to direct the developer onto the magnetic transporter away from the magnetic brushes and down directly into the lower portion of the housing. When the gate is in the position shown in dotted lines the developing assembly is placed in the operative condition. In the inoperative position the gate acts as a scrapper and guide which frees the developer from the magnetic transporter 37 and directs it onto the magnetic brushes 35. The developer is brought into contact with the surface of the photoreceptor by the upper magnetic brush where it is again brought into contact with the surface of the photoreceptor. The toner particles in the developer are attracted from the carrier particles to the photoreceptor as the developer is placed adjacent the photoreceptor by the magnetic brushes thereby developing the latent image thereon.

Each developing assembly operates in the manner described above, the latent image on the photoreceptor being developed by that particular developing assembly which has its gate in the position shown in dotted lines. Due to the simplicity of the gate device described above, each developing assembly can be maintained in a standby condition since its agitator, magnetic transporter and magnetic brushes can continue to rotate even though the assembly is not applying toner particles to the photoreceptor.

After the toner image is formed on the surface of the photoreceptor it is transferred from the photoreceptor to a copy sheet in the transfer station 40. Transfer drum 42 is adapted to convey a copy sheet through the transfer station in contact with and in registration with the toner image on the photoreceptor. In sheet feeding apparatus 70, an individual copy sheet is fed to the transfer drum as needed from a stack of sheets 72 by feed roller 71 which moves the sheets through guides 73 and onto the surface of the transfer drum. The copy sheet is fastened to the transfer drum 42 by a series of grippers and the drum carries the copy sheet in three revolutions through the transfer station to transfer the plurality of color images to the copy sheet. The transfer drum has the same size circumference as the photoreceptor and both rotate at the same speed, therefore, once the copy sheet is aligned with the grippers on the drum it is also in registration with the photoreceptor during all three transfer steps. The transfer station 40 includes pretransfer corona charging device 41 which adjusts the electrostatic charge on the toner particles to prepare the toner image from transfer to the copy sheet. The transfer drum 42 has a conductive core with a layer of relatively non-conductive material on its periphery. An electrical bias is applied to the conductive core of the transfer drum during the transfer step to create an electrostatic field between the photoreceptor and a copy sheet which urges the toner image from the photoreceptor to the copy sheet.

After making a plurality of revolutions on the transfer drum the copy sheet is stripped from the surface of the transfer drum by fingers 64 and conveyed into a fusing apparatus 60 by belt conveyors 62 and 63 where the fusing housing 61 fixes the toner image to the copy sheet. After the toner image is fixed to the copy sheet, the copy sheet is guided into vacuum transport assembly 80 by guides 65. The vacuum transport assembly includes a plurality of belts 83 and holes 82 to impose a vacuum between the belts. The vacuum and belt arrangement carries the copy sheet from the area of guides 65 towards storage tray 84 where it is stored.

After each toner image is transferred to the copy sheet, the surface of the photoreceptor is cleaned in preparation for subsequent revolutions in station 50. Cleaning station 50 includes a precleaning conora charging device 51 and a brush cleaning device 52 which act together to remove any residue toner remaining on the surface of the photoreceptor after transfer has taken place. Any toner that is removed by brush 52 is withdrawn from the brush into a filter bag apparatus 53 where it is held separate from the reproduction system.

Figure 2:
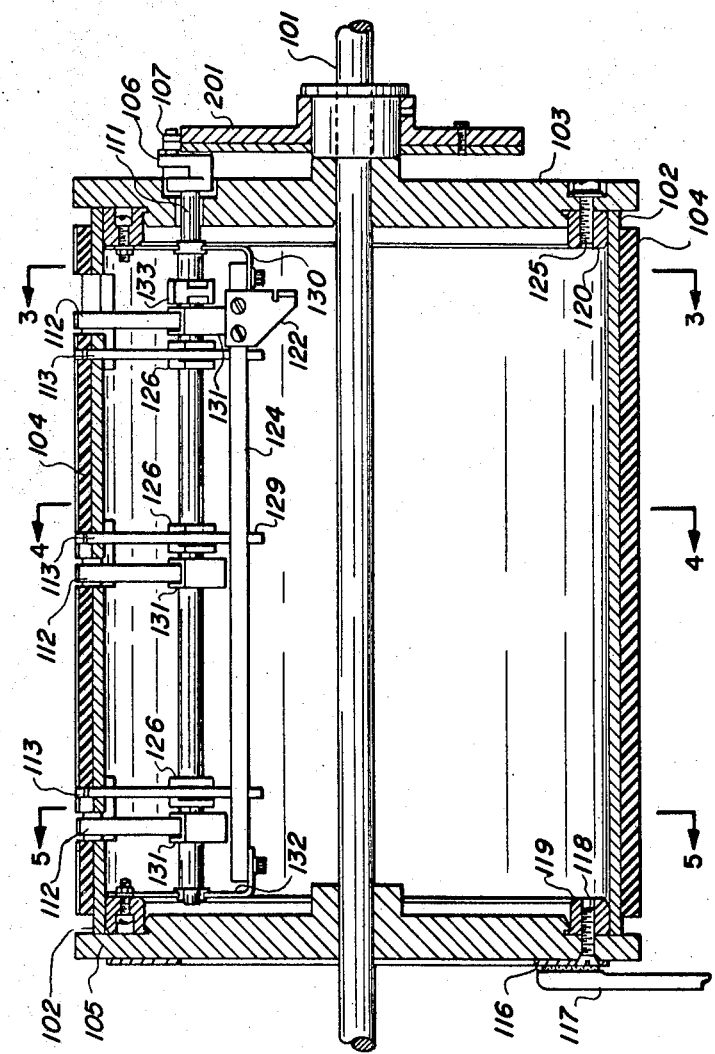
FIG. 2 is a cut-away view of the transfer drum.

Referring to FIG. 2, the transfer drum has a hollow, conductive core 102 with a layer 104 of insulating material. The cylindrical core 102 is made of any suitable conductive material such as aluminum and has a thin wall in order that the drum is lightweight and that the various mechanisms inside the drum have adequate room to function. The end plates 103 and 105, which are supported by and turn with main transfer drum shaft 101, are made of any suitable insulating material such as insulating plastic which effectively insulates the conductive core 102 from other parts of the machine. The outside surface of the conductive core contains a layer 104 of any suitable relatively non-conductive material, such as a rubber-like insulating material, upon which the copy sheet is supported as it is brought through the transfer station. The layer 104 is preferably made of a rubber-like material so that it yields and, consequently, is not likely to mar the photoreceptor if it should be brought into contact with it.

A ring 116, made of a conductive material such as brass, is fastened to end plate 105 in a concentric manner with shaft 102 and functions to transmit an electrical bias from stationary brush 117 to the conductive core of the drum. The brass ring 116 is secured to the end plate 105 by a plurality electrically conducting, metal screws 118. The metal screws pass through the end plate and are threaded into support ring 119 which, in turn, is in contact with the conductive core 102. The electrical bias on brush 117 passes through the ring 116, the screws 118, and support ring 119 to conductive core 102. The other endplate of the transfer drum, endplate 103, also has a support ring 120 and is fastened thereto by screws 125.

The transfer drum contains three sets of registration stops 113 and gripper fingers 112 which are keyed to shaft 111 and which operate to register and grip the leading edge of the copy sheet before the drum takes it through the transfer station. Shaft 111 and frame 124 are mounted on the support plates 130 and 132, shaft 111 being able to rotate about its longitudinal axis in response to the movement of the follower arm 106. Arm 123, together with a spring 115 (shown in FIG. 3) which biases the shaft 111 in one direction, arms 126 which control the movement of register stops 113, and arms 131 which support gripper fingers 112 are supported by and turn with support shaft 111.

Figure 6:
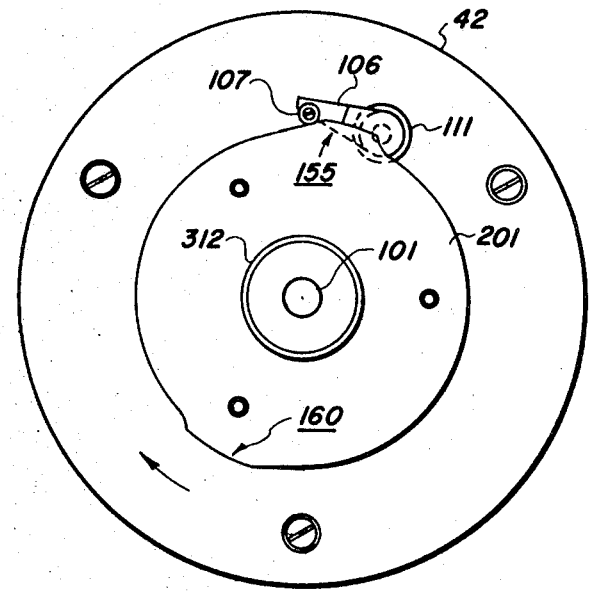
FIG. 6 is a view of the cam and follower which control the operation of the register stops and gripper fingers on the transfer drum.

The transfer drum also contains frame 124 which is fastened to support plates 130 and 132. In addition to supporting bracket 122, to which the spring on the end of arm 133 is fastened (shown in FIG. 3), the frame 124 contains slots 129 which guide the up and down movement of register stops 113. The movement of shaft 111 is controlled by a stationary cam 201 (shown in FIG. 6) in conjunction with follower 107 which rotates with the transfer drum. Follower 107, as it rotates with the transfer drum, moves about the periphery of fixed cam 201. The movement of the followers, in turn, causes arm 106 to move, and, since arm 106 is supported by and keyed to shaft 111, the shaft 111 rotates in response to the movement of the arm 106.

Figure 3:
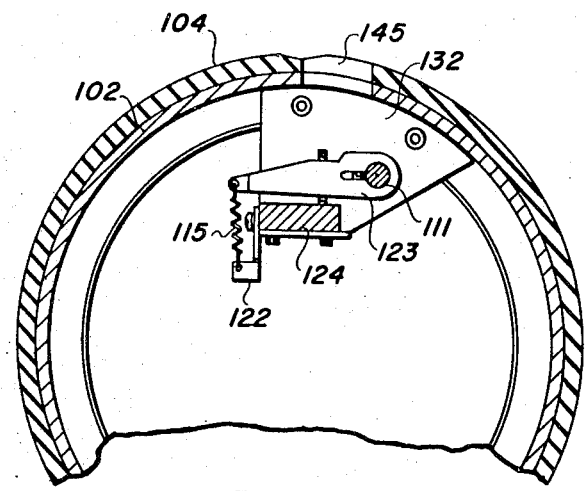
FIG. 3 is a partial section view of FIG. 2 taken through section 3—3.

Referring to FIG. 3, which is a partial view of the transfer drum in FIG. 2 taken through section 3—3, spring 115, acting through arm 123, biases shaft 111 in the counterclockwise direction. Internal frame 124 has spring support 122 attached to it which is suspended towards the center of the transfer drum and away from the free end of arm 123. The spring 115 is attached between the free end of arm 123 and the tip of the spring support 122. Since arm 123 is keyed to shaft 111, the spring 115 acts to bias the shaft in the counterclockwise direction thereby biasing the register stops 113 in their furthest downward position (see FIG. 4) and the gripper fingers 112 in their most clockwise direction (see FIG. 5).

Figure 4:
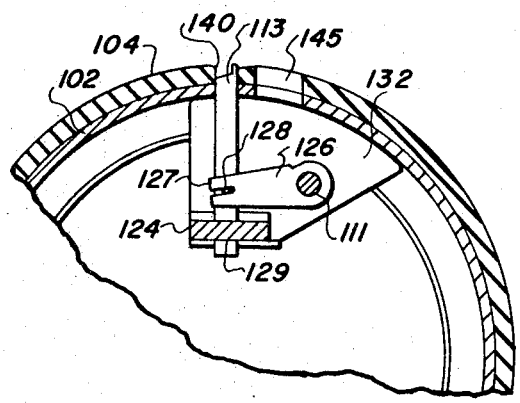
FIG. 4 is a partial section view of FIG. 2 taken through section 4—4.

Referring to FIG. 4, which is a partial view of the transfer drum shown in FIG. 2 taken through section 4—4, register stops 113 are guided in a straight line movement in a plane which is substantially normal to the surface of the transfer drum by the slot 140 in the transfer drum and the slot 129 in the frame 124. Arm 126, which is keyed to shaft 111, turns with the shaft to move register stops 113 either up or down depending on the direction of rotation shaft 111. Slot 127, which is positioned in the end portion of arm 126, is adapted to enable pin 128, which is fastened to register stop 113, to slide within it thereby transferring the rotary motion of the arm 126 to the linear motion of the register stop. As shaft 111 rotates in the counterclockwise direction, arm 126 rotates in the counterclockwise direction thereby driving register stop 113 in a linear path towards the center of the transfer drum. Then, when shaft 111 rotates in the clockwise direction arm 126 rotates in the clockwise direction thereby driving register stop 113 away from the center of the transfer drum to bring it above the surface of transfer drum. In FIG. 4, the register stops 113 are shown in their furthest downward position.

Figure 5:
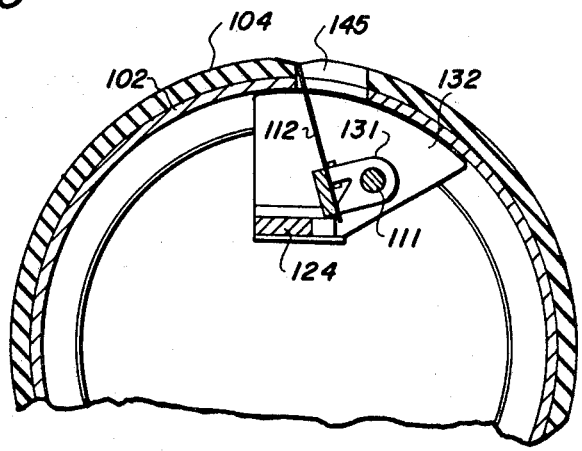
FIG. 5 is a partial section view of FIG. 2 taken through section 5—5.

Referring to FIG. 5, which is a partial view of the transfer drum shown in FIG. 2 taken through section 5—5, the gripper fingers 112 are supported by arm 131 which, in turn, is keyed to shaft 111. As shaft 111 turns in the counterclockwise direction, gripper fingers 112 rotate in the counterclockwise direction to bring the angled tip of the gripper fingers 112 down and into contact with the surface of the transfer drum. Then, when the shaft 111 rotates in the clockwise direction, arm 131 and gripper fingers 112 rotate to the clockwise direction to bring the tip of the gripper fingers 112 above and away from the surface of the transfer drum. The tip portion of the gripper fingers 112 move through slots 145 in the transfer drum when shaft 131 turns in either direction. In FIG. 5, the gripper fingers 112 are shown in their extreme counterclockwise position.

The movement of shaft 111 regulates the operation of the gripper fingers and register stops in unison to register, grip and, then, release the leading edge of a copy sheet. In operation, the shaft 111 first rotates in the clockwise direction from its biased position to bring the register stops and gripper fingers just above the surface of the transfer drum. A copy sheet is then fed onto the surface of the transfer drum until its leading edge is in register with register stops. When the leading edge of the copy sheet has been properly registered, shaft 111 rotates in the counterclockwise direction to bring the register stops below the surface of the transfer drum and the gripper fingers into the position where they press the leading edge of the copy sheet against the surface of the transfer drum. The transfer drum then continues to rotate through its plurality of consecutive revolutions during which the plurality of toner images are transferred from the photoreceptor to the copy sheet.

After the plurality of toner images have been transferred to the copy sheet and the copy sheet is to be removed from the transfer drum, shaft 111 rotates again in the clockwise direction, but to a greater extent than during the registering and gripping step. As a result the gripper fingers release the copy sheet and the register stops push the leading edge of the copy away from the transfer drum surface to such an extent that the leading edge also clears the tip of the gripper fingers. (This is possible since the register stops are joined to arms 126 at a greater distance from shaft 111 than the gripper fingers are joined from the shaft.) At this time stripper fingers 64 (shown in FIG. 1) are brought near the surface of the transfer drum and as the transfer drum continues to rotate, the copy sheet is completely separated from the drum surface and conveyed into the fuser 60 (also shown in FIG. 1). The register stops and gripper fingers then rotate counterclockwise with shaft 111 to return to the positions where they are biased by spring 115.

Referring to FIG. 1, transfer drum 42 has misfeed detector 43 adjacent it between sheet feeder 73 and the transfer station 40. The purpose of the misfeed detector is to detect when a copy sheet is improperly registered with the register stops, is not gripped properly by the gripper fingers, or has not been fed into the transfer drum at all. The detector is represented merely by a box adjacent the transfer drum in FIG. 1 since any suitable detector device can be used. For instance, a series of photocells can be placed adjacent the surface of the transfer drum with associated light sources, and, depending on where the leading edge of the sheet is positioned relative to the stops or where the gripper finger is located relative to the copy sheet, i.e. over or under the sheet, or whether or not a copy sheet is on the transfer drum at all, certain photocells are activated. The various combinations of photocell signals can then be "read" by a logic circuit to detect if a copy sheet is on the transfer drum and is properly aligned. If a copy sheet is properly aligned on the transfer drum, it is allowed to pass through the transfer station where a plurality of toner images are transferred to it. However, if the logic circuit determines that the copy sheet is not properly aligned, it generates a signal which is directed to a solenoid 320 (see FIG. 7) which activates the transfer drum withdrawal apparatus. The withdrawal apparatus rotates the transfer drum away from the photoreceptor thereby preventing the toner image from being transferred to a misaligned copy sheet or to the transfer drum surface when no sheet is on the drum. The apparatus which enables the transfer drum to rotate away from the photoreceptor is described in detail below.

Referring to FIG. 2, the rotation of shaft 111 is controlled by cam 201 and follower 107. The shaft 111, arm 106, and follower 107 rotate with the transfer drum while cam 201 remains in a stationary position. As a result of this arrangement the follower travels around the periphery of the cam and rotates arm 106 in response to the peripheral shape of the cam. The relationship between the cam and follower can be seen best in FIG. 6. Transfer drum 42, along with shaft 111, arm 106 and follower 107, is driven in the clockwise direction by shaft 101, as shown by the arrow. Cam 201, on the other hand, remains stationary relative to shaft 101 and, when engaged with the follower 107, forces the follower to move away from and towards the center of the transfer drum by cam portions 155 and 160. Through arm 106, cam portion 155 causes the registration stops and gripper fingers to register and grip the leading edge of the copy sheet while cam portion 160 causes the register stops and gripper fingers to release the leading edge of the sheet and drive it away from the surface of the transfer drum.

Referring to FIG. 7, cam 201 has a hub 312 which is adapted to slide along shaft 101 so that it can move between an operative position, whre it is engaged by follower 107, and an inoperative position, where it does not engage the follower. In this figure the cam and hub are shown in the operative position which places the hub against the end plate of the transfer drum 42. In its operative position, the cam 201 engages the follower and operates the registration stops and gripper fingers as described above. When it is desirable to move the cam out of engagement with the follower, for instance, when the copy is to be brought continuously through a plurality of revolutions on the transfer drum to effect transfer of a plurality of toner images to it, the cam is moved to the left thereby bringing it to its inoperative position.

Shaft 101, the shaft that supports and drives transfer drum 42, is mounted for rotation in frame members 304 and 308. Gear 351 and pulley 352 rotate on shaft assembly 350 which, in turn, is supported for rotation by frame 354. Frame 308 is adapted to rotate about shaft assembly 350 so that when the transfer drum 42 is moved away from photoreceptor 90, gears 351 and 353 remain in a meshed relationship to one another. A belt (not shown) driven by a suitable drive means rotates pulley 352 and gear 351 on shaft assembly 350. The gear 351 drives gear 353 which, in turn, drives the transfer drum 42 through shaft 101.

The movement of cam 201 between its inoperative position and its operative position, which is shown in FIG. 7, is controlled by the position of arm 203. When a signal is received by solenoid 211 to move the cam 201 to the right to its operative position, pin 206 is moved by the solenoid to the left. Arm 203, a second arm (not visible) is on the other side of shaft 101, pivots about pin 204 thereby causing the tip of the arm to force the cam 201 and hub 312 into its operative position against the action of spring 202. When the cam is in the operative position and a signal is received by the solenoid 211 to move it onto the inoperative position, pin 206 is allowed to move to the right causing arm 203 to rotate clockwise about pin 204. Due to the action of spring 202, (a second spring, not visible, is on the other side of shaft 101), which is fastened to hub 312, the cam 201 moves to the left and out of engagement with the follower.

Figure 9:
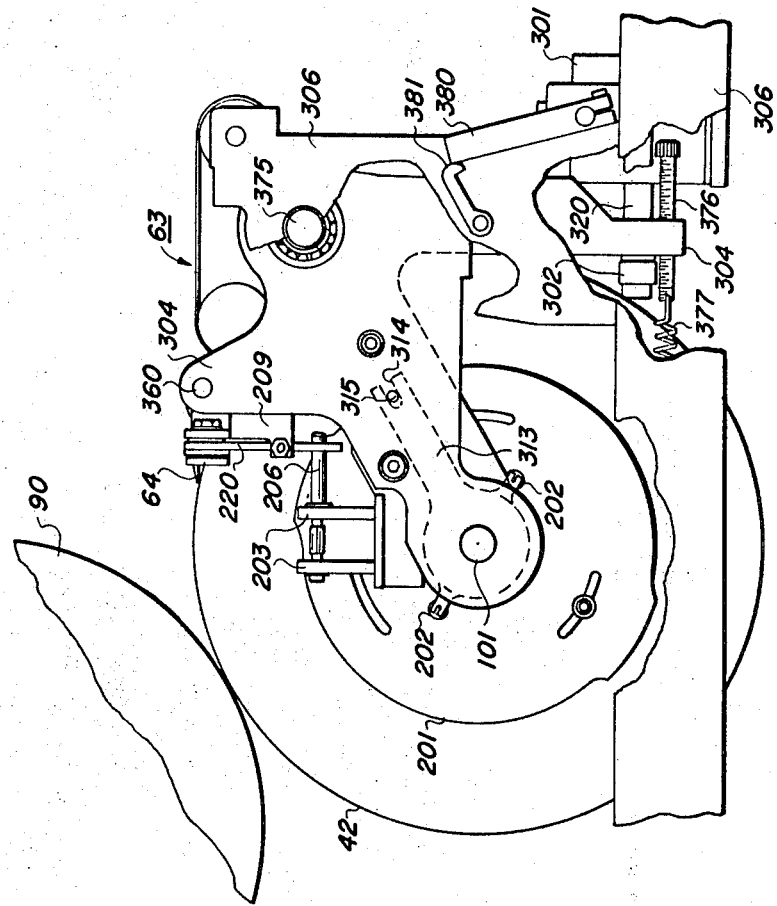
FIG. 9 is a side view of the transfer drum and supporting apparatus.
Figure 8:
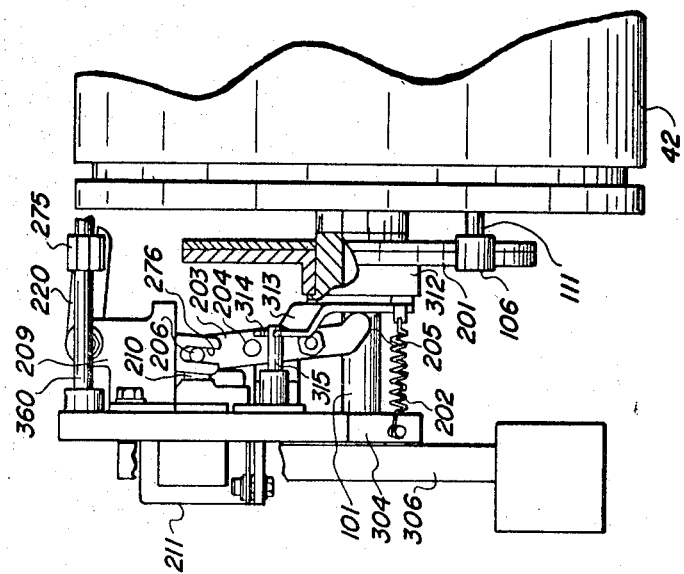
FIG. 8 is a detailed view of the mechanism which controls the position of the cam shown in FIG. 6.

FIG. 8 shows the view of the transfer drum in which part of the frame 306 is broken away from the mechanism which moves the cam so that the various elements of the mechanism can be clearly seen. Solenoid 211 moves pin 206 through solenoid arm 210, the arm moving either to the right and left depending on the signal received by the solenoid. Pin 204 is supported for rotation by an appendage of arm 304 and spring 202 is fastened to arm 304 to maintain a mechanical bias on the cam toward the inoperative position. Referring to FIG. 9, stripper fingers 64 on the top of the transfer drum when activated, are placed near the drum surface to help strip a copy sheet from the transfer drum after all the images have been transferred to the copy sheet. Referring to FIG. 7, stripper fingers 64 are supported for rotation by shaft 360 which, in turn, is supported for rotation in frames 306 and 308. The stripper fingers are activated by solenoid 211 also. Referring to FIG. 8, arm 275, which is keyed to shaft 360, rotates the shaft 360 to bring the stripper fingers in and out of position adjacent the surface of the transfer drum. Arm 220, which is supported to pivot on frame bracket 209, is in the shape of an L, the lower extremity of the arm having a slot 376 in which pin 206 travels. As solenoid arm 210 moves to the left bringing pin 206 into the clockwise or downward direction, the stripper fingers are brought adjacent the transfer drum surface. The linkage (not shown) between arm 275 and the horizontal extremity of arm 220 is similar to the linkage between pin 206 and slot 276, the arm 275 having a pin at its end which slides in a slot in the end of the horizontal extremity of arm 220. Through this linkage, arm 275 is forced down by arm 220 thereby rotating shaft 360 to bring the stripper fingers adjacent the surface of the transfer drum. Then, when the signal to solenoid arm 210 ceases, spring 202 causes arm 210 to move pin 206 to the right, the associated action of arms 220 and 275 and shaft 360 driving the stripper fingers away from the surface of the transfer drum. As a result of the linkage described above, the stripper fingers can come into contact with the transfer drum only during the time that cam 201 is in its operative position.

During the rotation of shaft 101, it is necessary to assure that cam 201 does not turn with the shaft, especially when the cam is in its operative position. Keeper arm 313 is intended for this purpose. The lower position of the keeper arm 313 is fastened to hub 312 while its upper portion has a slot 314 which is supported by pin 315. As the hub 312 moves along shaft 101, the keeper arm 313 moves with it, the upper portion of the keeper arm always sliding on pin 315 which is supported by arm 304. Due to this slot and pin arrangement, cam 201 always remains in a stationary position relative to the follower arm 106 even though the shaft 101 and the transfer drum 42 are continuously rotating.

Referring to FIG. 9, transfer drum 42 is brought away from the photoreceptor when a copy sheet is misfed onto its surface by the feeding mechanism. In such a circumstance misfeed detector 43 identifies a misaligned copy sheet or absence of a copy sheet and activates a mechanism which rotates arms 304 and 308 in the counterclockwise direction to carry the transfer drum as well as all of its collateral elements in the counterclockwise direction. When a misfeed signal is received by solenoid 301, solenoid arm 320 moves to the right or away from the transfer drum, bringing cross bar 302, to the right also. Cross bar 302 forces arms 304 and 308 in the counterclockwise direction against the action of spring 377 thereby moving both arms 304 and 308, and the transfer drum, in the counterclockwise direction about shafts 375 and 350. Spring 377 mechanically biases the transfer drum into contact with or in close proximity to the surface of the photoreceptor 90 so that a copy sheet on the surface of the transfer drum contacts the surface of the photoreceptor during the transfer step. By this withdrawal mechanism, the copy sheet can be withdrawn from the transfer station if misaligned or the transfer drum brought away from the transfer station if no copy sheet is on it so that the toner image cannot be transferred to the surface of the transfer drum. This arrangement prevents toner images from being transferred onto the transfer drum itself or onto the copy sheet in any other manner than in perfect register therewith.

Referring to FIG. 7, shaft 375 is mounted in frame 306 and supports arm 304 so that arm 304 can turn on the shaft when cross bar 302 forces the arm 304 to bring the transfer drum away from the photoreceptor. Shafts 350 and 375 have common centerlines and, as a consequence, as cross bar 302 forces frames 304 and 308 to rotate, the drive means for the transfer drum, including gears 351 and 353, moves in tact thereby maintaining the drive relationship. In this manner the position of any point on the transfer drum surface relative to any point on the photoreceptor surface is preserved even though the transfer drum is withdrawn from the photoreceptor because of a misfeeding of the copy sheet. Gear 351 is driven directly off the main shaft of the machine by a belt (not shown) through pulley 352.

The arm 304 can be rotated manually by engaging arm 380 with latch 381. Arm 380 can be rotated in the counterclockwise direction (refer to FIG. 9) by causing shaft 382 to rotate in the counterclockwise direction. Shaft 382 turns counterclockwise by pivoting arm 383 counterclockwise. Arm 383 is supported on brackets 384 and rotates about an axis coincident with shaft 382. As arm 383 pivots in the counterclockwise direction, connecting bars 385, which connect arm 383 and cross bar 302, are forced away from the transfer drum bringing arm 304 in the counterclockwise direction. The combination of the movement of arms 304 and 380 position arm 380 so as to engage the latch 381. Once the latch and arm are in this position, the transfer drum cannot return toward the photoreceptor until latch 381 is released manually. This manual latch feature is especially desirable when maintenance is to be carried out on the transfer drum.

As mentioned above in conjunction with FIG. 1, the photoreceptor makes a plurality of revolutions in order to complete a copying cycle and a toner image of one color is transferred to the sheet during each revolution. The copy sheet is fed onto the surface of the transfer drum while the drum rotates at the same speed as the photoreceptor. In order to register and grip the leading edge of the copy sheet with the register stops and gripper fingers as the transfer drum rotates, the copy sheet must be fed at a faster rate of speed than the speed at which the surface of the transfer drum is moving. Referring to FIG. 1 register rollers 74 feed the leading edge of the copy sheet onto the surface of the transfer drum 42 at a speed which is slightly faster than the speed at which the drum surface is moving and at a time when the register stops and gripper fingers are passing through the 6 o'clock position of the transfer drum. After the leading edge of the copy sheet is registered on the register stops, the gripper fingers grip the copy sheet and the copy sheet is carried through the transfer station 40 for three revolutions. During the time that register stops and gripper fingers pass through the 6 o'clock position of the transfer drum until just after gripper fingers grip the copy sheet, cam 106 (refer to FIG. 2) assumes its operative position in which it is engaged by the follower 107. After the gripper fingers have secured the copy sheet to the transfer drum surface, cam 201 is immediately moved to its inoperative position. Then, the transfer drum carries the copy sheet through three revolutions during which yellow, cyan and magenta toner images are transferred to the copy sheet. Of course, the cam 201 could be maintained in its operative position for each revolution of the transfer drum, or for any number of revolutions of the transfer drum, if it were desired to do so. After the leading edge of the copy passes through the transfer station for the final time, cam 201 is moved back into its operative position and the gripper fingers are operated to release the copy sheet, the register stops are activated to force the copy sheet away from the surface of the transfer drum and the stripper fingers are operated to separate the copy sheet from the drum and direct its leading edge towards the fusing apparatus. The stripper fingers are moved adjacent the surface of the transfer drum when the copy sheet is placed on the transfer drum also, due to the operative position of the cam during this time. However, the stripping fingers do not interfere with copy sheet being fed onto the drum during this time since they are located at approximately the 1 o'clock position of the drum while the leading edge of copy sheet is placed on the drum at approximately the 6 o'clock position.

The transfer of toner images from the photoreceptor to the copy sheet takes place at transfer station 40. During the transfer step, the copy sheet, which is supported against the periphery of the transfer drum, is brought into contact with the surface of the photoreceptor. During the transfer step the conductive core of the transfer drum is connected to any suitable potential such as a DC positive potential. Since the periphery of the transfer drum is preferably a very poor conductor of electricity, an electrostatic field is created between the photoreceptor and the transfer drum. This field urges the negatively charged toner image from the photoreceptor onto the copy sheet thereby effecting the transfer step.

It has been found that a toner image can be transferred from the photoreceptor to a clean copy sheet when the potential placed on the transfer drum is at least 700 volts. However, when successive toner images are transferred to the same copy sheet, transfer efficiency decreases at lower voltages as toner builds up on the copy sheet. For instance, when the first toner image, or yellow image, was transferred to the copy sheet at 1500 volts in the reproduction system described in the drawings, transfer was accomplished efficiently. Then, when the second toner image, or cyan image, was transferred onto the copy sheet over the yellow image, transfer of the cyan image was found to be relatively inefficient at 1500 volts. It is believed that the transfer efficiency was lowered in the case of the cyan image because of the increased resistivity placed between the copy sheet and photoreceptor due to the presence of the yellow toner image. When the third toner image, or magenta image, was transferred to the copy sheet over the yellow and cyan images by placing 1500 volts on the transfer drum, the transfer efficiency was again reduced over the efficiency of transfer of the cyan image. This additional decrease in transfer efficiency is believed to have been caused by the increased resistivity introduced by the presence of both the yellow and cyan images on the copy sheet during the third transfer step.

In order to overcome this undesirable decrease in transfer efficiency during successive transfers, the voltage placed on the transfer drum during the transfer step is increased after the first and second toner images are transferred to the copy sheet. For example, good transfer occurred during all three transfer steps when the voltage imposed on the transfer drum was 3000 volts during the first revolution to transfer the yellow toner image, 3500 volts during the second revolution to transfer the cyan toner image, and 4000 volts on the final revolution to transfer the magenta toner image. When the voltage on the transfer drum during each successive revolution is "stepped up" in this manner, the transfer efficiency during all three transfer steps is maintained at an optimum. The actual voltages used during each of the three transfer steps can be any suitable voltages which transfer the toner images so long as the voltage value is increased in each succeeding transfer.

Figure 10:
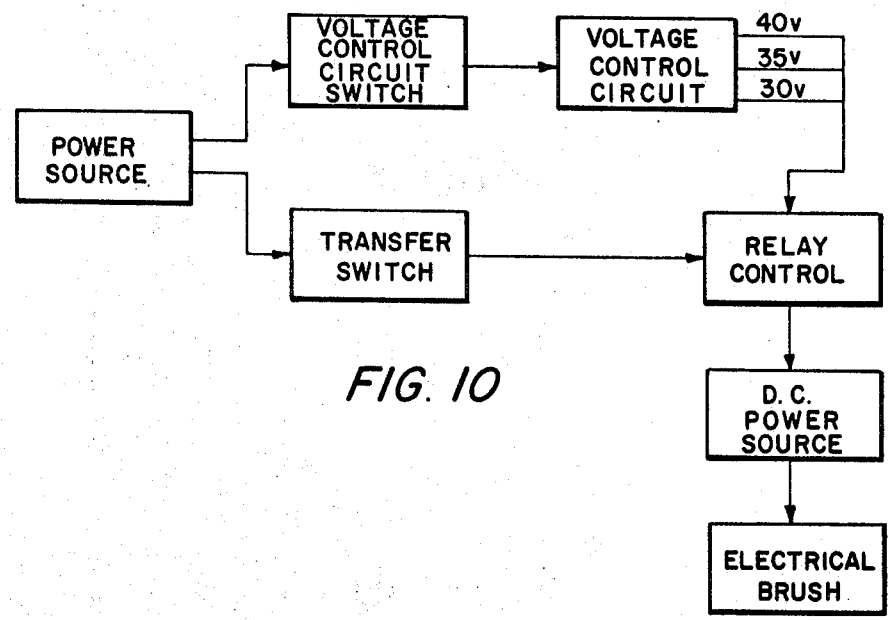
FIG. 10 is a block diagram of the control device which steps up the electrical potential on the transfer drum.

The apparatus for stepping up the voltages on the transfer drum can be any suitable apparatus which functions to increase the voltage in each successive revolution of a copy cycle. For example, FIG. 10 illustrates a control apparatus in block diagram form which is suitable for this purpose. During each revolution of the photoreceptor, two electrical signals are generated from the transfer drum to indicate that the transfer step is about to begin. Any suitable device can be used to generate the signals; for instance, two cams can be placed on the shaft driving the photoreceptor which have follower arms which, in turn, close a switch as transfer begins to allow current to pass through the switch. The signal generating devices illustrated in clock form in FIG. 10 are two such cam switches in conjunction with a power source. One switch is a transfer switch which is closed by its cam and follower arrangement just as the leading edge of the copy sheet enters the transfer station to give the "go" signal to the control apparatus to apply a voltage to the transfer drum. The other switch is a voltage control circuit switch which tells the voltage control circuit that another revolution is being made by the photoreceptor.

The voltage control circuit is a device which has three possible output voltages. The exact output voltage of the control circuit during each transfer step is dependent on how many signals have already been received from the voltage control circuit switch during the copying cycle. At the beginning of the copying cycle in a three color system; that is, during the first revolution of the photoreceptor, a first signal enters the voltage control circuit and the resulting output of the control circuit is the lowest voltage of its three possible output voltages. Then, during the second revolution of the photoreceptor another signal is fed to the voltage control circuit which results in the voltage control circuit stepping up its output to a voltage which is higher than that of the first revolution. Similarly, during the third and final revolution of the photo-receptor, another signal is fed to the voltage control circuit which results in the voltage control circuit stepping up its output to the highest voltage of its three possible output voltages. At this time the copy cycle has been completed and a new copy cycle begins with a subsequent revolution of the photoreceptor. During the fourth revolution, or the first revolution of a new copying cycle, the voltage control circuit again generates the lowest voltage of its three possible output voltges in response to another signal from the voltage control circuit signal.

Each output voltage of the voltage control circuit is passed through a relay control before being fed into the DC power supply. The signal generated by the transfer switch is fed to the relay control also. The relay control allows current to pass from the voltage control circuit outputs to the DC power source only when the "go" signal has been received from the transfer switch. The DC power supply, in turn, delivers a voltage to the electrical brush which is a multiple of the voltages fed to it. Assuming that the three output voltages of the voltage control circuit are 30, 35, and 40 volts, and the DC power source generates a voltage which is ten times the voltage it receives from the voltage control circuit, the electrical brush will deliver to the core of the transfer drum 3000, 3500 and 4000 volts in the first, second, and third revolutions, respectively, of the photoreceptor.

It is intended that appropriate drive means be associated with the color copying system described herein, and such drive means used can be any suitable type. For instance, the main shaft 91 of the machine can be driven by a main machine motor and the various processing stations around the photoreceptor driven therefrom by a suitable gearing arrangement. In addition, the appropriate control circuits can be applied throughout the machine in order to assure that it functions as described above.

In addition to the apparatus outline above, many other modifications and/or additions to this invention will be readily apparent to those skilled in the art upon reading this disclosure, and these are intended to be encompassed within the invention disclosed and claimed herein.

What is claimed is:

1. In a sheet conveying system including a hollow cylindrical drum having end plates fastened thereto, a main shaft journaled for rotation in a frame to support the drum through its end plates for rotation about its geometrical axis, means to rotate the main shaft, means to feed a sheet onto the surface of the drum, at least one register stop and gripper finger operably located on the drum, and a support shaft parallel to the main shaft rotatably mounted in the endplates at a remote location from the main shaft and adapted to movably support the register stop and gripper finger, an apparatus for selectively controlling the movement of the register stop and gripper finger comprising:

(a) a cam slidably supporting on the main shaft adjacent the drum having an operative position immediately adjacent the drum and in inoperative position remotely adjacent the drum, the cam being biased in its inoperative position, (b) a follower arm supported by and rotatable with the support shaft having a follower member on the end thereof adapted to follow the periphery of the cam when the cam is in its operative position so that during the time the cam is in its operative position the rotation of the follwoer arm, support shaft, register stop and gripper finger are controlled in accordance with the shape of the cam, and (c) means to slide the cam along the main shaft from its biased inoperative position to its operative position.

2. The apparatus in claim 1 wherein the means to slide the cam to its operative position is a control arm which is substantially perpendicular to the main shaft and fastened to the frame to pivot about its mid portion, the control arm positioned so that one end thereof contacts the cam, and, further including, means to move the other end of the control arm when the register stop and gripper finger are to be operated to enable the first end of the control arm to move towards the transfer drum as the control arm pivots thereby sliding the cam into its operative position.

3. The apparatus in claim 1 further including a keeper arm attached to the cam having a slot therein which enables the keeper arm to slide along a stationary pin mounted on the frame as the cam slides into its operable position to maintain the cam stationary relative to the main shaft and the drum.

4. A sheet conveying system for conveying sheets of paper in cyclic operation whereby a gripper mechanism holds a sheet through multiple cycles of operation of the conveyor including (a) a rotatable cylindrical member having sheet grippers extending through the surface thereof and adapted to hold a sheet of paper on the surface of the cylindrical member, (b) registration guides within the cylindrical member which are movable through the surface of the cylindrical member into a sheet registering position, (c) a non-rotatable cam slidably mounted on shaft adjacent the cylindrical member which is movable between an operative and an inoperative position, (d) a cam follower mounted for rotation with the cylindrical member and positioned to engage the cam when the cam is in the operative position, the cam follower being operatively connected to the sheet grippers and the registration guides to open the sheet grippers by action of the cam and to move the registration guides into a sheet registering position by action of the cam, and (e) means to move the cam between its operative and inoperative position on selected cycles of rotation at the cylindrical member to release a sheet on the cylindrical member and to register and grip a sheet fed onto the cylindrical member.

References Cited

UNITED STATES PATENTS

| 1,078,238 | 11/1913 | Barber | 271—80 |
| 1,626,600 | 5/1927 | Clauberg | 271—80 |
| 3,049,076 | 8/1962 | Ritzerfeld et al. | 271—53X |

EVON C. BLUNK, Primary Examiner

D. D. WATTS, Assistant Examiner

U.S. Cl. X.R.

271—53, 82